United States Patent [19]

Keedy

[11] 4,142,755
[45] Mar. 6, 1979

[54] VEHICLE DRAG REDUCER

[76] Inventor: Edgar L. Keedy, P.O. Box 83, Liberty Center, Ohio 43532

[21] Appl. No.: 824,083

[22] Filed: Aug. 12, 1977

[51] Int. Cl.² .................................................. B62D 35/00
[52] U.S. Cl. ........................................... 296/1 S; 296/91
[58] Field of Search ........................................ 296/1 S, 91

[56] References Cited

U.S. PATENT DOCUMENTS

| 609,789 | 8/1898 | Capewell | 296/1 S |
| 1,352,679 | 9/1920 | Myers | 296/1 S |
| 3,945,677 | 3/1976 | Servais | 296/1 S |

*Primary Examiner*—Philip Goodman
*Attorney, Agent, or Firm*—Oliver E. Todd, Jr.

[57] ABSTRACT

A truck tractor and trailer combination is disclosed having air deflector shields extending from the cab to the trailer and a drag reducer shield enclosing the rear end of the trailer whereby air drag against the truck tractor and trailer is substantially reduced.

5 Claims, 13 Drawing Figures

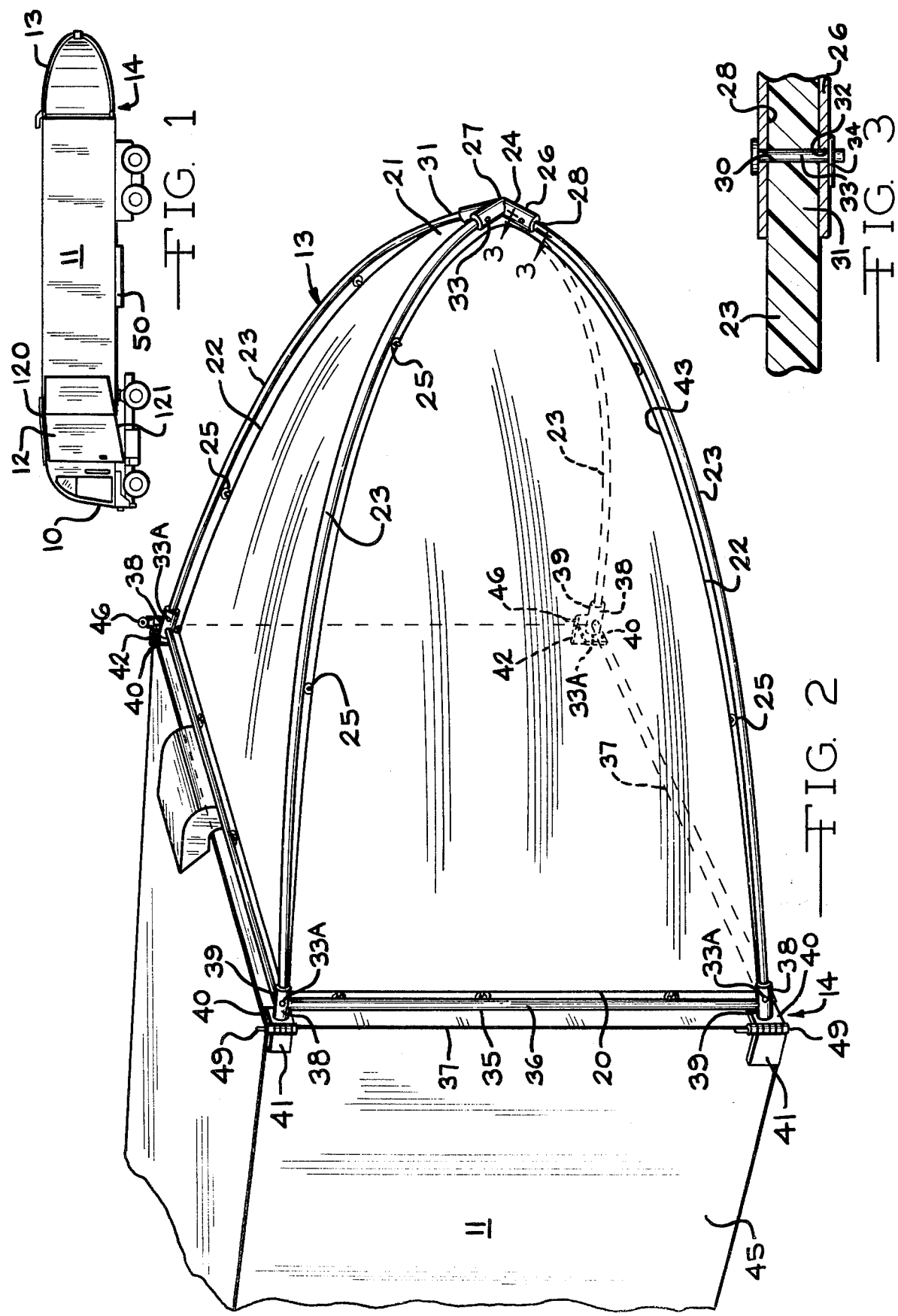

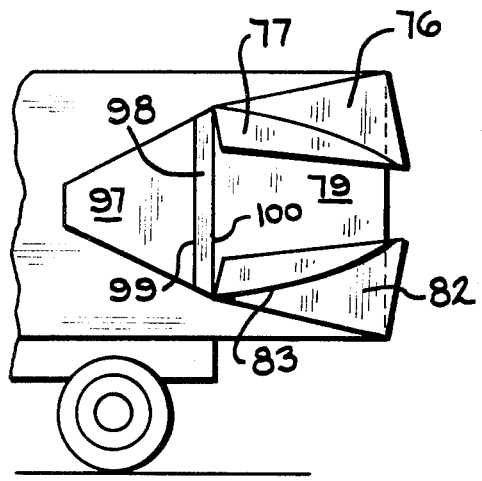
FIG 7
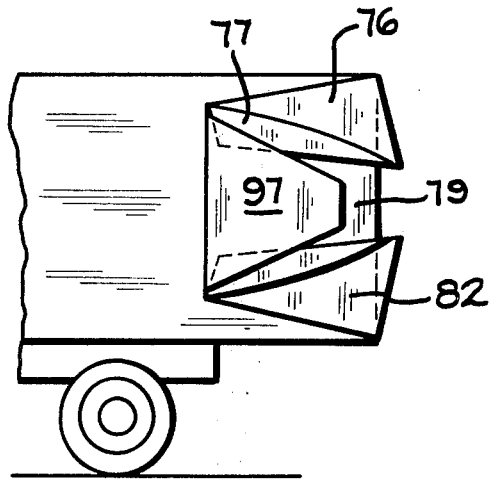
FIG 8
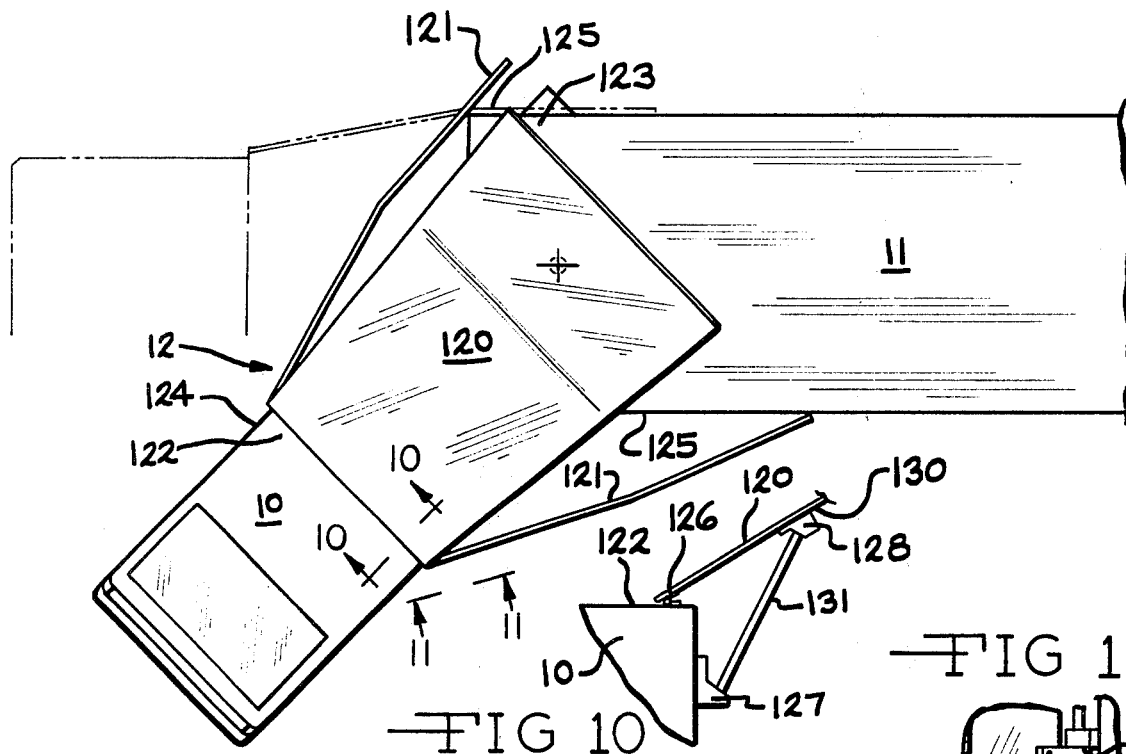
FIG 9
FIG 10
FIG 12
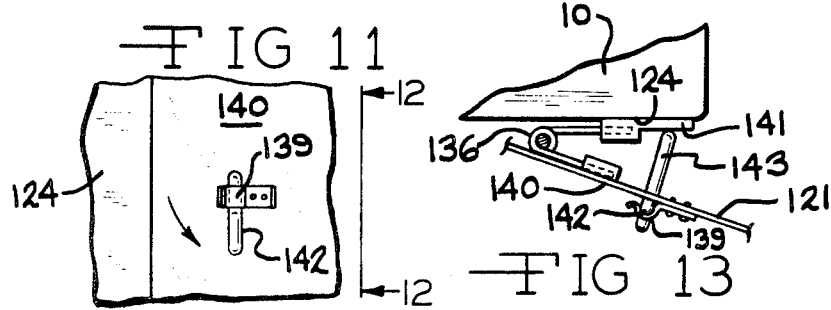
FIG 11
FIG 13
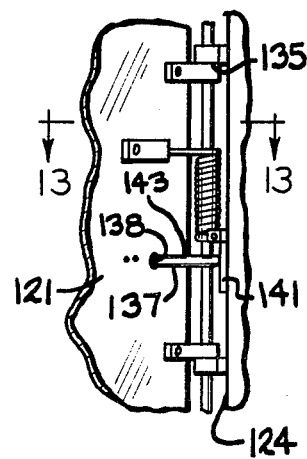

VEHICLE DRAG REDUCER

BACKGROUND OF THE INVENTION

Due to competition in freight carrier services by rail, sea, and air, the trucking industry has been strongly concerned about the efficiencies of their own system. In recent years, the costs of truckage have increased as a result of increased fuel costs and mandated lower speed limits eventuating from fuel shortages. One approach to offsetting such increased costs is to decrease fuel consumption.

Fuel consumption of the freight-hauling truck tractor and trailer combinations in a function of weight, engine efficiency, and air drag. Since the freight capacity must be maintained at a high level in order to satisfy the economics of trucking, the size and, thus, the weight of the truck combinations cannot be decreased enough to result in substantial fuel savings. Of course, improvements in engine efficiency will always be made but they are not sufficient by themselves to eliminate the burden caused by weight and air drag. Air drag, especially between the tractor and the trailer and at the rear end of the trailer, is a very important cause of poor fuel consumption. A truck tractor and trailer combination that gets about four miles per gallon loaded, for example, may only get four and one half miles per gallon unloaded when operated at the same high speed. It is known that this mileage can be increased by placing an air deflector above the cab of the truck trailer. Redesign or modifications to present designs of truck tractor and trailer combinations would greatly reduce such air drag and, thus, reduce fuel consumption.

SUMMARY OF THE INVENTION

The present invention relates to the above-described problem of air drag and its effect upon the fuel consumption of truck tractor and trailer combinations used in long hauling of freight. The invention comprises an assembly of air deflector shields surrounding the space between the tractor and the trailer, and a streamlined drag reducer shield at the rear end of the trailer, whereby air drag in those regions is substantially decreased. The shields are easily removable to provide access to the trailer when desired.

It is, therefore, an object of the present invention to provide a truck tractor and trailer combination having reduced air drag.

It is also an object of the present invention to provide a truck tractor and trailer combination including air drag shields which are easily removable to allow access to the trailer.

BRIEF DESCRIPTION OF THE DRAWINGS

FIG. 1 is an overall perspective view of a truck, tractor and trailer combination in accordance with the present invention;

FIG. 2 is a fragmentary perspective view of the truck tractor and trailer combination in FIG. 1 illustrating one embodiment of the drag reducer shield at the rear end of the trailer;

FIG. 3 is a sectional view along the line 3—3 in FIG. 2;

FIG. 7 is a side elevational view of one section of the drag reducer shield in FIG. 5 in its partially folded position;

FIG. 8 is a side elevational view of one section of the drag reducer shield shown in FIG. 5 in its completely folded position;

FIG. 9 is a fragmentary top plan view of the truck, tractor and trailer combination in FIG. 1 illustrating the air deflector assembly;

FIG. 10 is a sectional view along the line 10—10 in FIG. 9;

FIG. 11 is a fragmentary side view illustrating a spring hinging means for attaching the side deflector shields to the truck tractor;

FIG. 12 is a cross sectional view taken along line 12—12 in FIG. 11; and

FIG. 13 is a cross sectional view taken along line 13—13 in FIG. 12.

DETAILED DESCRIPTION OF THE DRAWINGS

Figure 4:
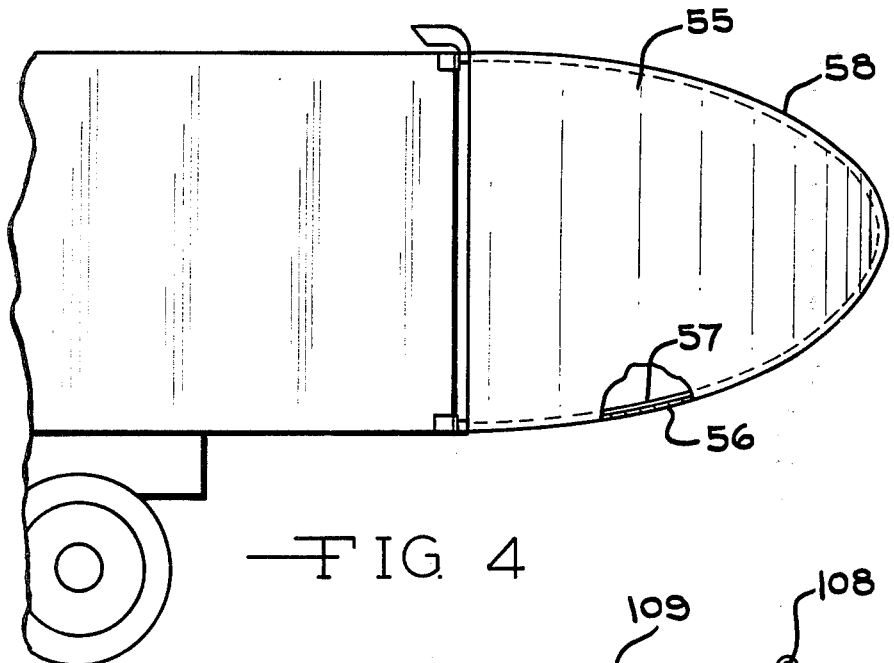
FIG. 4 is a side elevational view with a broken-out section of a modified embodiment of the drag reducer shield in FIG. 2.

The present invention relates to low drag truck tractor and trailer combinations, as shown generally in FIG. 1, having a cab 10, a trailer 11, an air deflector assembly 12 extending from the cab 10 to the trailer 11, and a drag reducer shield 13 at the rear end 14 of the trailer 11. The air deflector assembly 12 and the drag reducer shield 13 streamline the truck tractor and trailer to decrease its gas consumption when operated at high speeds.

One embodiment of the drag reducer shield 13 and its assembly to the rear end 14 of the trailer 11 are shown in detail in FIG. 2. It comprises a front end 20, a rear end 21, an outer surface 22, four rods 23, a spider joint 24, and a support means 25 for supporting the outer surface 22 upon the rods 23. The spider joint 24 consists of four tubular legs 26 radiating from a common apex 27 in a pyramidal fashion outwardly and toward the front end 20 of the drag reducer shield 13. Each of the rods 23 fits respectively within a different one of the tubes 28 of the legs 26 of the spider joint 24, as shown in FIG. 3. A hole 30 through the end 31 of each of the rods 23 is lined up with a corresponding hole 32 through each of the legs 26 of the spider joint 24, and a pin 33 is inserted therethrough. A retaining clip 34 may then be used to secure the pin 33 from ejection.

Each of the rods 23 are then attached at the front end 20 of the drag reducer shield 13 to a rectangular framework 35. The rectangular framework 35 includes cross-support bars 36 co-extending with the periphery 37 of the rear end 14 of the trailer 11, tubular joints 38 at each of the corners 39 of the framework 35 coinciding with the corners 40 of the rear end 14 of the trailer 11, and hinges 41 and 42. Each of the rods 23 is inserted into a corresponding tubular joint 38 and pinned as described above in reference to the spider joint 24 and FIG. 3. When in place, the rods 23 curve convexly from the front end 20 of the drag reducer shield 13 to the rear end 21 at the spider joint 24. The outer surface 22, constructed of any flexible material capable of withstanding the forces of the wind and the other elements during use, is then fastened to the rods 23 and the cross-support bars 36 by support means 25, thereby being made streamlined. Since the air flowing across the rear end 14 of the trailer 11 would normally cause a vacuum at the rear end 14 of the trailer 11, an air scoop 44 is provided to pressurize the chamber 43 and prevent the outer surface 22 from being drawn inward.

The drag reducer shield 13 may be rotated away from the rear end 14 and toward the left side 45 of the trailer 11 by simply removing the hinge pins 46 from the hinges 42 on the right side 48. Similarly, the shield 13 may be rotated away from the rear end 14 and toward the right side 48 of the trailer 11 by removing the hinge pins 49 from the hinges 41 on the left side 45. In such a manner, access to the rear end 14 of the trailer 11 for loading and unloading purposes in facilitated.

The drag reducer shield 13 is also easily disassembled by removing the pins 33 and 33A from each of the joints 24, 28, and unfastening the outer surface 22 from the rectangular framework 35. The shield 13 may then be collapsed and stored in a compartment 50, shown in FIG. 1, underneath the trailer 11.

FIG. 4 illustrates a modification to the drag reducer shield 13, whereby the outer surface 55 is supported by and extends over the outside 56 of rods 57. In all other respects, the drag reducer shield 58 in FIG. 4 is the same as the drag reducer shield 13 in FIGS. 1 and 2.

Figure 5:
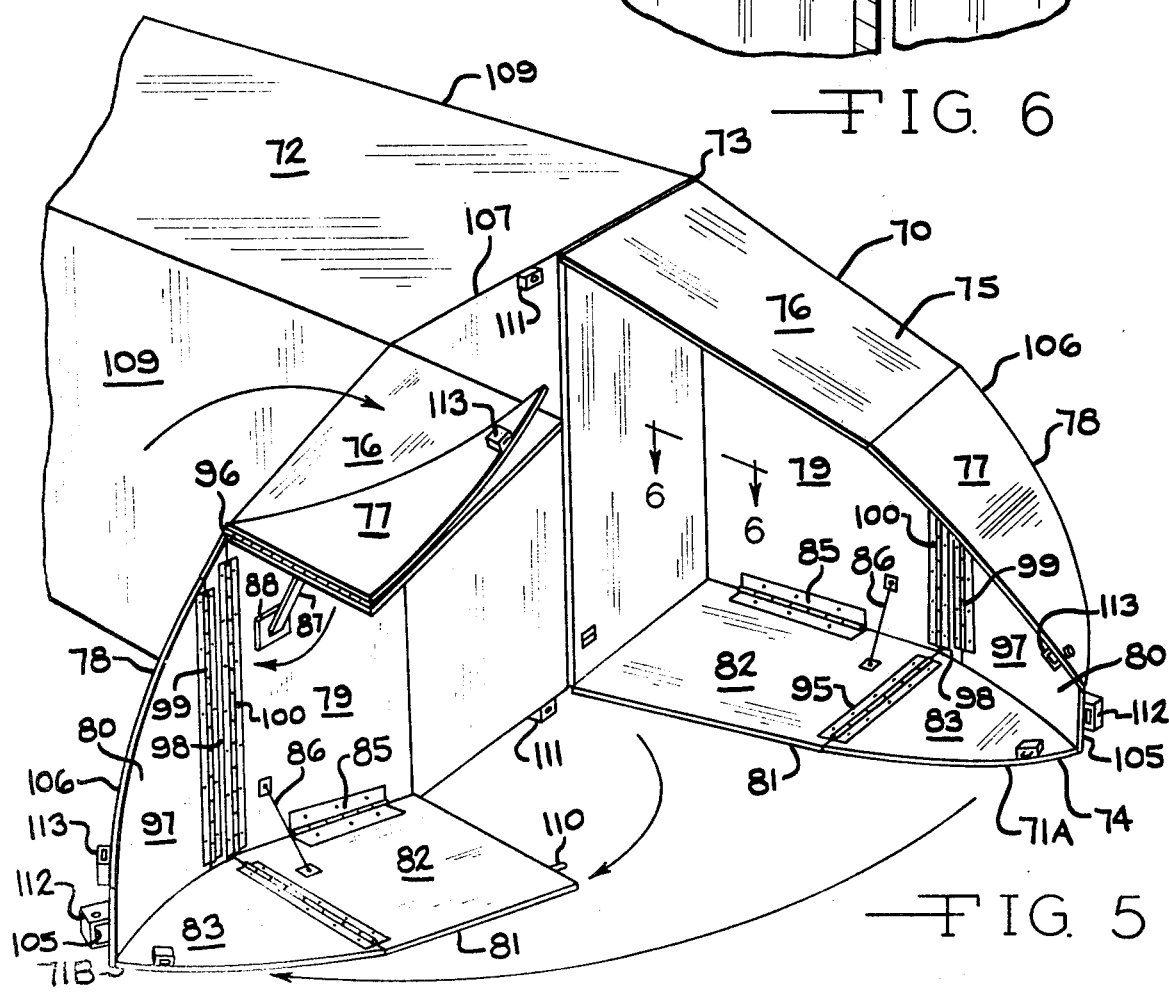
FIG. 5 is a perspective view of still another embodiment of a drag reducer shield at the rear end of the trailer.

FIG. 5 illustrates a rigid embodiment of a drag reducer shield 70 which may be incorporated into a truck tractor and trailer combination of the present invention. The shield 70 includes two substantially symmetrical sections 71A and 71B separable along a central vertical plane extending along the length of the trailer 72 and having front and rear ends 73 and 74 respectively. Each section 71A and 71B includes a top 75 having front and rear panels 76 and 77, a side 78 having front and rear panels 79 and 80, and a bottom 81 having front and rear panels 82 and 83.

The bottom front panels 82 are connected and supported perpendicularly to the side front panels 79 by means of 90° hinges 85. Collapsible support wires 86 are also provided for additional support to the bottom front panels 82. Similarly, the top front panels 76 are adjoined to the side front panels 79 by hinges, not shown. Rigid support rods 87, mounted in a swiveling relationship with a bracket 88 on the side front panels 79, are provided to hold up the top front panels 76.

The bottom rear panels 83 and bottom front panels 82 are connected by single hinges 95. Similarly, the top rear panels 77 and top front panels 76 are connected by hinges 96. The side rear panels 80 include a main body section 97 and a folding section 98 connected by a hinge 99. The entire side rear panel 80 is then attached to the side front panel 79 by a hinge 100. The two hinges 99 and 100 and the folding section 98 facilitate folding the drag reducer shield 70 as described below in conjunction with FIGS. 7 and 8.

The top front, side front, and bottom front panels 76, 79 and 82 of the drag reducer shield 70 are substantially flat, and are designed to slope inward such that when the two sections 71A and 71B are closed together, the front panels 76, 79, 82 generally form a truncated pyramid. The remaining rear panels 77, 80 and 83 are curved inward, converging at an apex 105 at the rear 74 of the shield 70. In such a manner, the drag reducer shield 70 has an outer surface 106 which is generally streamlined.

Figure 6:
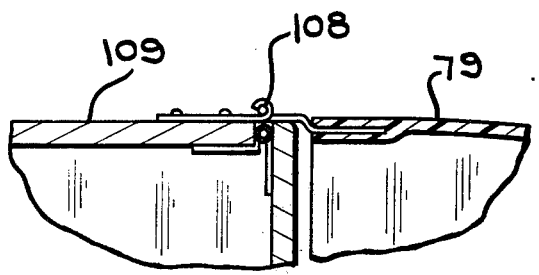
FIG. 6 is a sectional view along the line 6'6 in FIG. 5.

Each of the sections 71A and 71B are joined to the rear end 107 of the trailer 72 by means of hinges 108, shown in FIG. 6, between the side front panels 79 and the sides 109 of the trailer 72. The hinges 108 allow each of the sections 71A and 71B to be rotated away from the rear end 107 to abut the sides 109 of the trailer 72. When the sections 71A and 71B are rotated into a closed position, pins 110 on the top front and bottom front panels 76 and 82 engage locks 111 on the trailer 72, which partially secure the shield 70 in the closed position and provide structural support to the panels 76 and 82. Additionally, the two sections 71A and 71B are secured together by a main lock 112 at the rear end 74 of the shield 70. Also, locking means 113 are located on adjacent sections of the top and side front panels 77 and 80 for engagement when the panels are in their closed position. Other such locks may, of course, be located where desired.

As mentioned above, the two sections 71A and 71B rotate about the hinges 108 away from the rear end 107 and toward the sides 109 of the trailer 72. This rotation renders the rear end 107 of the trailer 72 readily accessible for loading or unloading purposes. However, oftentimes, a trucker will not wish to use the drag reducer shield 70, for example on short trips within a city. Therefore, the above-described features also allow the shield 70 to be folded relatively flat against the sides 109 of the trailer 72 where it may be held in place and stored by any suitable means.

FIGS. 7 and 8, in conjunction with FIG. 5, illustrate the method of folding the drag reducer shield 70 against the sides 109 of the trailer 72. The locking means 113 may comprise a pin and socket which are disengaged by simply lifting up on the top rear panel 77 and, then, the top rear panel 77 is rotated upward about the hinge 96 until the panel 77 rests upon the top front panel 76. The rigid support rods 87 are swiveled downward which releases the top front panel 76, allowing it to fold against the side front panel 79. The bottom front panel 82 is then folded upward and the bottom rear panel 83 is folded upward to meet the side front panel 79. At this point, the drag reducer shield 70 is folded as shown in FIG. 7.

Next, the side rear panel 80 is rotated about the two hinges 99 and 100, such that it folds over the top and bottom panels 76, 77, 82 and 83. The folding section 98 of the side rear panel 80 aids in accommodating the thicknesses and slight curvature of the folded top and bottom panels 76, 77, 82 and 83. At this point, the drag reducer shield 70 is completely folded as shown in FIG. 8. Suitable means, such as locking straps, not shown, may be used to secure the folded shield 70 against the sides 109 of the trailer 72.

It should be observed that, since the drag reducer shield 70 is constructed of rigid material such as sheet metal, fiberglass, or stiff plastic, it is unnecessary to use a scoop such as the scoop 44 shown in FIG. 2, to prevent the shield 70 from being drawn inward under the pressure differential.

FIG. 9 illustrates the air deflector assembly 12 of the truck tractor and trailer combination shown in FIG. 1. The assembly 12 includes a top deflector shield 120 and two side deflector shields 121. The top deflector shield 120 is attached to the rear top 122 of the cab 10 and extends to and over a front top 123 of the trailer 11. Similarly, the side deflector shields 121 are attached to the rear sides 124 of the cab 10 and extend to and over front sides 125 of the trailer 11.

As shown in FIG. 10, the top deflector shield 120 is attached to rear top 122 of the cab 10 by a spring hinge 126. The spring hinge 126 urges the top deflector shield 120 to contact and rest on the front top 123 of the trailer 11. Brackets 127 and 128 are located appropriately on the rear 129 of the cab 10 and on the underside 130 of the top deflector shield 120, so that a rigid support rod 131 may be inserted therebetween to counteract the spring hinge 126 and hold the top deflector shield 120 out of contact with the trailer 11 when desired. For example, it would be desirable to place the rod 131 between the brackets 127 and 128 when assembling or disassembling the cab 10 to the trailer 11 or when the cab 10 and trailer 11 are assembled, but it is necessary to gain access to the area enclosed by the deflector shields 120 and 121.

As shown in FIGS. 11, 12 and 13, each side deflector shield 121 is fastened to the rear side 124 of the cab 10 by means of a hinge 135. A spring 136 is incorporated into the hinge 135 and attached to both the side deflector shields 121 and the cab 10, such that the shield 121 is urged to contact the front sides 125 of the trailer 11. In FIGS. 11, 12 and 13, however, the side deflector shield 121 is restrained temporarily from contacting the trailer 11 by an L-shaped pin 137 extending through a hole 138 in the shield 121, and abutting between a restraining clamp 139 on the outside 140 of the shield 121 and a wear plate 141 on the cab 10. The L-shaped pin 137 comprises a handle 142 and a brace section 143. To release the pin 137, and thereby cause the side deflector shield 121 to contact the trailer 11, the handle 142 is pivoted about the hole 138 away from the confinement of the restraining clamp 139. The force then exerted by the spring 136 is sufficient to push the brace section 143 of the pin 137 through the hole 138 in the side deflector shield 121, so that the pin 137 may be removed and stored. The purposes for the pin 137 are the same as for the support rod 131 described above.

Although any suitable lightweight rigid material may be used to construct the deflector shields 120 and 121, it is advantageous for obvious reasons that the shields 120 and 121 be transparent, allowing the truck operator to view the area enclosed therein.

Also, although the above-described embodiment is designed for use with rigid shields, the shields could be made from a flexible material, wherein each shield is attached to the rear top and sides of the cab and extends to and overlaps the front top or sides of the trailer, and is attached to the trailer by any suitable extensible means, such as tension springs. The tension springs would serve a dual function of maintaining tautness in the flexible shields and of returning the shields to their original position after the truck tractor and trailer has turned a corner. Of course, with such flexible shields, it would be advantageous to include an air scoop which would pressurize the area enclosed by the shields to prevent them from being drawn inward.

What I claim is:

1. A low drag truck tractor and trailer combination comprising a truck tractor having a cab, a trailer, an air deflector assembly comprising air deflector shields attached to said cab of said truck tractor and extending to and overlapping the sides and top of the front end of said trailer and means for uging said shields into contact with said trailer, said air deflector assembly reducing air drag in the region between said truck tractor and said trailer, and a drag reducer shield attached to enclose the rear end of said trailer defining an inner chamber and having a generally streamlined outer surface, and front and rear ends, said outer surface at said front end of said drag reducer shield being substantially coextensive with the perimeter of the rear end of said trailer, said outer surface converging generally convexly to an apex at said rear end of said drag reducer shield, and means for removing said shield from enclosing the rear end of said trailer, and wherein said air deflector assembly includes three air deflector shields, means attaching one of said deflector shields to the top and near the rear of said truck tractor cab and extending to and overlapping the top of the front end of said trailer, means attaching the other two of said air deflector shields to the opposite sides near the rear of said cab and extending to and overlapping the respective sides of the front end of said trailer.

2. A low drag truck tractor and trailer combination comprising a truck tractor having a cab, a trailer, an air deflector assembly comprising air deflector shields attached to said cab of said truck tractor and extending to and overlapping the sides and top of the front end of said trailer and means for urging said shields into contact with said trailer, said air deflector assembly reducing air drag in the region between said truck tractor and said trailer, and a drag reducer shield attached to enclose the rear end of said trailer defining an inner chamber and having a generally streamlined outer surface, and front and rear ends, said outer surface at said front end of said drag reducer shield being substantially coextensive with the perimeter of the rear end of said trailer, said outer surface converging generally convexly to an apex at said rear end of said drag reducer shield, and means for removing said shield from enclosing the rear end of said trailer, and wherein said air deflector shields are rigid and said urging means consists of spring hinges for attaching said shields to said cab, said spring hinges applying pressure to urge contact between said shields and said trailer.

3. A low drag truck tractor and trailer combination comprising a truck tractor having a cab, a trailer, an air deflector assembly comprising air deflector shields attached to said cab of said truck tractor and extending to and overlapping the sides and top of the front end of said trailer and means for urging said shields into contact with said trailer, said air deflector assembly reducing air drag in the region between said truck tractor and said trailer, and a drag reducer shield attached to enclose the rear end of said trailer defining an inner chamber and having a generally streamlined outer surface, and front and rear ends, said outer surface at said front end of said drag reducer shield being substantially coextensive with the perimeter of the rear end of said trailer, said outer surface converging generally convexly to an apex at said rear end of said drag reducer shield, and means for removing said shield from enclosing the rear end of said trailer, and further including a rectangular framework of four rods coextensive with the perimeter of the rear end of said trailer, fastening means at each corner of said rectangular framework attached to the rear end of said trailer, wherein said drag reducer shield includes four curved rods, means detachably fastening each of said curved rods at one end to a different one of said fastening means and at the other end to the other of said rods near the apex of said outer surface, a flexible membrane detachably mounted on said rectangular framework and said curved rods forming said outer surface and said inner chamber, and air deflector means for directing air into said inner chamber when said trailer is in forward motion, whereby said drag reducer device is removable from the rear end of said trailer by detaching said curved rods from said detachably fastening means.

4. A low drag truck tractor and trailer combination, as defined in claim 3, wherein said fastening means includes horizontally revolving hinges having detachable pins whereby said drag reducer device is removable from the rear end of said trailer by detaching said detachable pins from said hinges at the corners of one side of the trailer and swinging said drag reducer device about said hinges at the corners of the opposite side of said trailer.

5. A low drag truck tractor and trailer combination comprising a truck tractor having a cab, a trailer, an air deflector assembly comprising air deflector shields attached to said cab of said truck tractor and extending to and overlapping the sides and top of the front end of said trailer and means for urging said shields into contact with said trailer, said air deflector assembly reducing air drag in the region between said truck tractor and said trailer, and a drag reducer shield attached to enclose the rear end of said trailer defining an inner chamber and having a generally streamlined outer surface, and front and rear ends, said outer surface at said front end of said drag reducer shield being substantially coextensive with the perimeter of the rear end of said trailer, said outer surface converging generally convexly to an apex at said rear end of said drag reducer shield, and means for removing said shield from enclosing the rear end of said trailer, and wherein said drag reducer shield includes two substantially symmetrical sections separable along a central vertical plane extending along the length of said trailer, means for releasably locking together said sections to form said outer surface, said sections each comprising a plurality of rigid panels, hinge means interconnecting said rigid panels in each section for folding said sections from said outer surface to a generally flat arrangement, and hinge means along the sides of the rear end of said trailer for joining each of said sections to said trailer and for swinging such folded sections away from said trailer rear end.

* * * * *